United States Patent

Miyauchi et al.

[11] Patent Number: 5,942,331
[45] Date of Patent: Aug. 24, 1999

[54] COLORED FILM-COATED GLASS ARTICLE

[75] Inventors: Taro Miyauchi; Mitsuhiro Kawazu; Koichi Maeda, all of Osaka, Japan

[73] Assignee: Nippon Sheet Glass Co., Ltd., Osaka, Japan

[21] Appl. No.: 08/898,365

[22] Filed: Jul. 22, 1997

[30] Foreign Application Priority Data

Jul. 23, 1996 [JP] Japan ................................ 8-193301
Sep. 11, 1996 [JP] Japan ................................ 8-240431

[51] Int. Cl.$^6$ ........................................ B32B 17/00
[52] U.S. Cl. ........................ 428/428; 428/328; 428/329; 428/432; 428/433; 428/434
[58] Field of Search ...................... 428/428, 432, 428/328, 329, 433, 434

*Primary Examiner*—Timothy M. Speer
*Attorney, Agent, or Firm*—Sughrue, Mion, Zinn, Macpeak & Seas, PLLC

[57] ABSTRACT

A sunligh absorbing colored film-coated glass article which can freely control color tint, infrared transmittance, UV light transmittance, and visible light transmittance. The colored film-coated glass article which comprises a glass substrate and a colored film formed on one surface thereof, the colored film comprising, in % by weight:

5–30% at least one coloring fine particle selected from the group consisting of gold, silver, platinum, palladium, cadmium sulfide, and cadmium selenide;

0–50% silicon oxide;

0–70% titanium oxide;

0–20% cerium oxide; and

5–95% at least one coloring metal oxide selected from the group consisting of cobalt oxide, chromium oxide, copper oxide, manganese oxide, nickel oxide, and iron oxide, with the proviso that the total amount of silicon oxide, titanium oxide, and iron oxide is 10 to 95 wt %.

6 Claims, No Drawings

COLORED FILM-COATED GLASS ARTICLE

FIELD OF THE INVENTION

The present invention relates to a colored film-coated glass article. More particularly, it relates to a colored film-coated glass plate which is used for vehicle (automobile) windows and building windows.

BACKGROUND OF THE INVENTION

There are several methods for producing colored glass, which are by ion exchange, particle deposition, or sputtering. The ion exchange method comprises coating a glass surface with silver or copper in the form of an inorganic salt thereof and then calcining the coated glass such that ultrafine particles of silver or copper infiltrate into a glass substrate and develop a transparent colloid coloration therein. The particle deposition method comprises coating the glass substrate with a metal alkoxide solution containing gold ions and then heat treating the coated substrate, thereby precipitating gold fine particles. The sputtering method comprises forming a metal film on the glass substrate by deposition.

On the other hand, there are several conventional methods for forming a sunlight-absorbing colored film on a glass substrate. Such methods include pyrolysis method, sol-gel method, and sputtering method, which are designed to form the film from a transition metal oxide such as cobalt oxide, manganese oxide, copper oxide, iron oxide, chromium oxide, or cerium oxide, individually or as the respective composite oxide.

The above-described colored film does not possess all of the coloring performance, solar energy shielding performance, and ultraviolet (hereinafter referred to as "UV") light absorbing performance. JP-A-6-191896 (The term "JP-A" used herein means an "unexamined published Japanese patent application") discloses a glass article coated with a colored film containing silicon oxide, titanium oxide, and gold fine particles, with the preferred composition of 85-3% by weight of $TiO_2$, 40-0% by weight of $SiO_2$ and 5-60% by weight of Au. However, this colored film-coated glass article is not satisfactory. If the $TiO_2$ content is small in the above-described range, UV light shielding performance is not sufficient. On the other hand, if the $TiO_2$ content is increased, high UV light shielding performance is obtained and coloration of from blue to pink is obtained, but transmitted light color tint, UV light transmittance, and visible light transmittance cannot be freely controlled.

SUMMARY OF THE INVENTION

Accordingly, an object of the present invention is to provide a colored film-coated sunlight-absorbing glass article which can freely control color tint, sunlight transmittance, visible light transmittance (which is also called "luminous transmittance"), and UV light transmittance.

According to the present invention, there is provided a colored film-coated glass article which comprises a glass substrate and a colored film formed on one surface thereof, the colored film comprising, in % by weight:

5 to 30% at least one fine coloring particle selected from the group consisting of gold, silver, platinum, palladium, cadmium sulfide, and cadmium selenide;

0 to 50% silicon oxide;

0 to 70% titanium oxide;

0 to 20% cerium oxide; and 5 to 95% at least one coloring metal oxide selected from the group consisting of cobalt oxide, chromium oxide, copper oxide, manganese oxide, nickel oxide, and iron oxide, with the proviso that the total amount of silicon oxide, titanium oxide, and iron oxide is 10 to 95%.

DETAILED DESCRIPTION OF THE INVENTION

The present invention is explained in detail below.

Each component in the composition of the UV absorbing colored film is explained below.

Silicon oxide is a component necessary to maintain strength of the film. If the content of the silicon oxide is too low, the strength of the film is lowered, and also the visible light reflectance of the film becomes too high. On the other hand, if the content thereof is too large, the transparency of the film is decreased and simultaneously the sunlight absorbing performance is decreased. Therefore, the content of silicon oxide (in terms of $SiO_2$) is 5 to 50 wt %, preferably 7 to 40 wt %, and more preferably 9 to 30 wt %. However, the content of silicon oxide may be less than 5 wt % or zero, if the film contains titanium oxide or iron oxide, so long as the total amount of silicon oxide, titanium oxide, and iron oxide falls within the range of 10 to 95 wt %.

Titanium oxide is a component necessary for film formation, and also is a component which has effect to improve hot water resistance of the film. If the content of titanium oxide is too low, the film formation property of the film is decreased and also the sunlight absorbing performance is decreased. On the other hand, if the content thereof is too large, the film formation property is lowered and the visible light reflectance of the film becomes too high. Therefore, the content of titanium oxide (in terms of $TiO_2$) is 5 to 70 wt %, preferably 15 to 60 wt %, and more preferably 25 to 50 wt %. However, the content of titanium oxide may be less than 5 wt % or zero, if the film contains silicon oxide or iron oxide, so long as the total amount of silicon oxide, titanium oxide, and iron oxide falls within the range of 10 to 95 wt %.

Cerium oxide is not an essential component, but is a component effective to enhance the UV light absorbing performance of the film. Cerium oxide is added where the UV light absorption performance is not sufficient depending on the composition of glass substrate and the concentration of coloring metal oxides described hereinafter, and the UV light absorption performance is desired to further increase. If the content thereof is too large, the visible light absorption and film formation property are lowered. Therefore, the content of cerium oxide (in terms of $CeO_2$) is 0 to 20 wt %, and preferably 5 to 20 wt %.

The coloring metal oxides comprising at least one of cobalt oxide, chromium oxide, copper oxide, manganese oxide, nickel oxide, and iron oxide are a component necessary to absorb all of infrared rays, visible light, and UV light. If the content of coloring metal oxides is too low, absorbing property of near infrared rays and visible light is lowered. Therefore, the total amount of cobalt oxide (in terms of $Co_3O_4$), chromium oxide (in terms of $Cr_2O_3$), copper oxide (in terms of CuO), manganese oxide (in terms of $MnO_2$), nickel oxide (in terms of NiO), and iron oxide (in terms of $Fe_2O_3$) is 5 to 95 wt %. If the total amount of these metal oxides (excluding iron oxide) is too high, the strength of the film is lowered. Therefore, the total amount of cobalt oxide, chromiun oxide, copper oxide, manganese oxide and nickel oxide is preferably 40 wt % or less, and the content of iron oxide 95 wt % or less. Further, the total amount of the coloring metal oxides including iron oxide is preferably 5 to 40 wt %, more preferably 10 to 35 wt %, and most preferably 15 to 35 wt %. Iron oxide is a component to improve the film formation property. If the total amount of silicon oxide and titanium oxide is less than 10 wt %, iron oxide is added such that the total amount of silicon oxide, titanium oxide, and iron oxide is 10 wt % or more.

If the total amount of the coloring metal oxides (excluding iron oxide) and cerium oxide is too large, the film formation property tends to be lowered. Therefore, the total amount of the coloring metal oxides and cerium oxide, i.e., in terms of $Co_3O_4$, $Cr_2O_3$, $MnO_2$, $CuO$, and $CeO_2$, is preferably 10 to 50 wt %, and more preferably 25 to 40 wt %.

At least one fine coloring particle selected from the group consisting of gold, silver, platinum, palladium, cadmium sulfide, and cadmium selenide, is necessary to obtain a large selective absorption and coloration, in the visible light region. If the content of the fine coloring particles is too low, sufficient coloration cannot be obtained. On the other hand, if the content thereof is too high, the durability of the film is lowered. Therefore, the total amount of the fine coloring particles is 5 to 30 wt %, and preferably 10 to 20 wt %.

If the thickness of the colored film is too small, the sunlight absorbing performance is lowered, and the desired coloration is not obtained. On the other hand, if the thickness thereof is too large, the strength of the film is lowered. Therefore, the thickness of the colored film is preferably 40 to 300 nm, more preferably 60 to 200 nm, and most preferably 120 to 200 nm. Further, the colored film has a refractive index of 1.70 to 2.10.

Where the colored film-coated glass plate is used for automobile windows, it is usually fitted thereto with the film-coated surface being inside. If the visible light reflectance viewed from the inside of automobile is too high, there is the possibility to obstruct the view of a driver. Therefore, the visible light reflectance of an incident light from the film surface side of the glass plate is preferably minimized as about 20% or less as possible. Further, it is preferred on appearance for the reflection color tint form the glass surface (outside of automobile) opposite the coated film to be close to a neutral gray. The color is preferably such that the saturation (the value of $(a^2+b^2)^{1/2}$ calculated from the values of a and b in Hunter's Lab colorimetirc system) is 10 or less.

Alternatively, the sunlight absorbing colored film-coated glass plate is fitted to automotive windows with the coated surface inside. In this case, if the reflected light color of visible light, viewed from the outside of automobile is far away the transmitted light color of the visible light, disadvantage may occur on the design. For this reason, it is preferred on the appearance that the reflected light color tint is close to the transmitted light color. This is achieved if the angle between the reflected light color vector (Cref=(a,b)) and the transmitted light color vector (Ctra=(a,b)), both calculated from the values of a and b in the Hunter's Lab colorimetric system, is 120° or less, and preferably 60° or less.

Of the fine coloring particles used in the present invention, chlorides or nitrates, such as chloroauric acid, silver nitrate, or palladium chloride, are appropriate as the raw materials for fine particles of gold, silver, platinum, palladium, cadmium sulfide, or cadmium selenide. However, those are not specifically limited so long as those are stable and soluble. Examples of the raw materials for cadmium sulfide and cadmium selenide include cadmium acetate, cadmium nitrate, cadmium chloride, and $SeC(NH_2)$.

The colored film-coated glass article of the present invention is obtained by coating a glass substrate with a solution, drying the resulting coating and then calcining the coated substrate. The solution comprises a compound that forms the fine coloring particles, raw materials for silicon oxide, titanium oxide, cobalt oxide, chromium oxide, copper oxide, manganese oxide, nickel oxide, iron oxide, and cerium oxide, and if required and necessary, catalysts, additives, and an organic solvent. The cadmium sulfide is obtained by sulfuration in the course of the above calcination.

There is no specific limitation on the raw materials for silicon oxide, titanium oxide, cerium oxide, and coloring metal oxides. Any material can be used so long as it forms a transparent film by a sol-gel method. This is specifically described below.

A preferred raw material for silicon oxide is a metal alkoxide, and examples thereof include tetramethoxysilane, tetraethoxysilane, tetrapropoxysilane, and tetrabutoxysilane. Further, their condensates (n≧2), or a mixture of the condensates are also appropriately used. Examples of the condensates which can be used include hexaethoxydisiloxane (n=2), octaethoxytrisiloxane (n=3), decaethoxytetrasiloxane (n=4), and ethoxypolysiloxane (n≧5). An example of a mixture of condensate (n≧2) and the monomer, which is preferably used, is "Ethyl Silicate 40" which has a composition comprising 12.8 wt % of monomer (n=1), 10.2 wt % of dimer (n=2), 12.0 wt % of trimer (n=3), 7.0 wt % of tetramer (n=4), 56.2 wt % of polymer (n≧5), and 1.8 wt % of ethanol, as disclosed in J. Cihlar, *Colloids and Surfaces A*:Physicochem. Eng. Aspects 70 (1993), pp. 253–268.

Further, alkyltrialkoxysilanes wherein alkoxy groups in the above-described compounds are replaced by alkyl groups can also be used. Examples of the groups which can used for substitution include a straight-chain or branched alkyl group such as methyl group, ethyl group, propyl group, butyl group, 2-ethylbutyl group, or octyl group; a cycloalkyl group such as cyclopentyl group or cyclohexyl group; an alkenyl group such as vinyl group, allyl group, γ-methacryloxypropyl group, or γ-acryloxypropyl group; an aryl group such as phenyl group, toluyl group, or xylyl group; an aralkyl group such as benzyl group, or phenetyl group; γ-mercaptopropyl group; γ-chloropropyl group; and γ-aminopropyl group.

A preferred raw material for titanium oxide is an organotitanium compound, such as titanium alkoxide, titanium acetylacetonate, or titanium carboxylate. Titanium alkoxide is generally represented by the formula $Ti(OR)_4$ wherein R is an alkyl group having 4 or less carbon atoms. Titanium propoxide and titanium butoxide are preferable from the standpoint of reactivity. On the other hand, titanium acetylacetonate is preferable because of its stability. This compound is represented by the formula $Ti(OR)_m L_n$ wherein m+n=4, n is at least 1, and L represents acetylacetone. This compound is commercially available or may be prepared by acetylacetonating titanium alkoxide with acetylacetone. Titanium carboxylate may also be used.

A preferred raw material for cerium oxide is an organocerium compound, such as cerium alkoxide, cerium acetylacetonate, or cerium carboxylate. An inorganic cerium compound in the form of nitrate, chloride, or sulfate can also be used. Cerium nitrate and cerium acetylacetonate are preferable because of their stability and availability.

A preferred raw material for cobalt oxide is an organocobalt compound, such as cobalt alkoxide, cobalt acetylacetonate, or cobalt carboxylate. An inorganic cobalt compound in the form of nitrate, chloride, or sulfate can also be used. Cobalt chloride and cobalt nitrate are preferable because of their stability and availability.

A preferred raw material for chromium oxide is an organochromium compound, such as chromium alkoxide, chromium acetylacetonate, or chromium carboxylate. An inorganic chromium compound in the form of nitrate, chloride, or sulfate can also be used. Chromium chloride, chromium nitrate, and chromium acetylacetonate are preferable because of their stability and availability.

A preferred raw material for copper oxide is an organocopper compound, such as copper acetylacetonate, copper carboxylate, copper acetate, or copper-diethanolamine complex. An inorganic copper compound in the form of nitrate, chloride, or sulfate can also be used. Copper chloride, copper nitrate, and copper acetylacetonate are preferable because of their stability and availability.

A preferred raw material for manganese oxide is an organomanganese compound, such as manganese acetylacetonate, manganese carboxylate, manganese acetate, or manganese-diethanolamine complex. An inorganic manganese compound in the form of nitrate, chloride, or sulfate can also be used. Manganese chloride and manganese nitrate are preferable because of their stability and availability.

A preferred raw material for nickel oxide is an organonickel compound, such as nickel acetylacetonate, nickel carboxylate, nickel acetate, or nickel-diethanolamine complex. An inorganic nickel compound in the form of nitrate, chloride, or sulfate can also be used. Nickel chloride and nickel nitrate are preferable because of their stability and availability.

A preferred raw material for iron oxide is an organoiron compound, such as iron acetylacetonate, iron carboxylate, iron acetate, or iron-diethanolamine complex. An inorganic iron compound in the form of nitrate, chloride, or sulfate can also be used. Iron chloride and iron nitrate are preferable because of their stability and availability.

Of the elements constituting the colored film in the present invention, it is preferred for silicon or titanium to determine the kind of its raw material and its mixing ratio, considering miscibility with a solvent, fine coloring particles, cerium, and transition metal compounds; stability; optical properties such as refractive index, color, or reflected light color tint; mechanical properties such as wear resistance; and chemical durability.

A coating solution for forming the colored film of the present invention is prepared by dissolving each of raw materials in the respective solvent, and mixing those solutions in a prescribed proportion.

The solvent used in the coating solution, that is, an organic solvent, depends on the film formation method employed. For example, a solvent having low evaporation rate is preferable as the organic solvent for gravure coating, flexographic printing, and roll coating. This is because a solvent having high evaporation rate evaporates before completion of sufficient levelling. Evaporation rate of solvents is generally evaluated in terms of the relative evaporation rate index when that of butyl acetate is 100. Solvents naving its index of 40 or less are classified as solvents having "very low" evaporation rate, and such solvents are preferable for gravure coating, flexographic printing, and roll coating. Examples of such solvents include ethyl cellosolve, butyl cellosolve, cellosolve acetate, diethyleneglycol monoethyl ether, hexyleneglycol, diethyleneglycol, tripropyleneglycol, diacetonealcohol, and tetrahydrofurfurylalcohol. The solvent of the coating solution used in the present invention preferably contains at least one of such solvents. A plurality of those solvents may be used in order to control the viscosity and surface tension of the coating solution. In addition, a solvent having a high evaporation rate i.e., having a relative evaporation rate index exceeding 100, such as methanol (610), ethanol (340), n-propanol (110), or isopropanol (300), may be added to the solvent having a relative evaporation rate index of 40 or less.

The coating method that is used in the present invention is not specifically limited. Examples of the coating method which can be used include spin coating, dip coating, spray coating, and printing. In particular, the printing such as gravure coating, flexographic printing, roll coating, or screen printing is preferable because of its high productivity and efficient use of the coating solution composition.

The coating solution for colored film is applied to a glass substrate by any of the above-described coating methods, and heat treated at 100 to 400° C. for 5 to 200 minutes in an oxidizing atmosphere, or in a sulfur atmosphere where the coating solution is a solution to form a film containing fine particles of cadmium sulfide, to precipitate the coloring fine particles in the coating film. Further, calcination is conducted at 500 to 700° C. for 10 seconds to 5 minutes, thereby forming a colored film having a thickness of 60 to 200 nm.

The glass substrate used in the present invention is a transparent glass plate having soda lime silicate glass composition. Such a glass plate preferably is a heat ray-shielding colored glass plate having the properties of chromaticity of the transmitted light, defined by a=−9.0 to −4.0 and b=1.0 to 4.0 in the Hunter's Lab colorimetric system; light green coloration; UV light (370 nm) transmittance of 20 to 70%; visible light transmittance of 70 to 85%; sunlight transmittance of 40 to 65%; and thickness of 1.5 to 5.5 mm.

Such a glass plate is preferably used as a glass plate for automobile windows.

This glass plate preferably has a composition of $SiO_2$:72.4 wt %, $Al_2O_3$:0.13 wt %, $Fe_2O_3$ (total iron):0.558 wt %, FeO:0.135 wt %, CaO:8.77 wt %, MgO:3.84 wt %, and $Na_2O$:13.8 wt %.

According to the present invention, the color, and the transmittances of visible light, infrared rays, and UV light can be freely controlled by combining the coloration due to the fine coloring particles and the sunlight shielding properties due to the coloring metal oxides. Therefore, the present invention can produce a sunlight shielding colored glass plate having a visible light transmittance (Ya) ("a" light source) of 50% or less as the glass properties, and preferably a UV shielding colored glass having a sunlight transmittance (Tg) of 50% or less, and preferably 40% or less, as the glass properties.

The present invention will be described in more detail by reference to the following examples, but it should be understood that the invention is not construed as being limited thereto.

In the Examples and Comparative Examples, the spectra of transmitted light were measured using a self-recording spectrometer with an integrating sphere (Model UV-3100, made by Shimadzu Corporation) and the thickness of the colored film was measured using ALPHA-STEP 200 (made by Tencor Instrument).

The following three kinds of glass substrates, each having a size of 3.4 mm×10 cm×10 cm, were used.

Colorless transparent soda lime silicate glass plate:

Luminous transmittance Ya=81.2%

Sunlight transmittance Tg =60.9%

Visible light reflectance rg=8.0%

T 370 nm=62.5%

This glass plate is hereinafter referred as as "Clear" or "C".

Green glass substrate:
Ya=81.2%
Tg=60.9%
rg=7.1%
UV light transmittance Tuv=52.6% (according to ISO 9050)
T 370 nm=62.5%
Color tint of transmitted light=light green
Chromaticity of transmitted light in the Lab color system: a=−4.7, b=0.9, and L=91
Chromaticity of reflected light in the Lab color system: a=−1.3 and b=−0.2
This glass is hereinafter referred to as "Green" or "G".

Light yellowish green glass substrate:
Ya=73.1%
Tg=48.9%
rg=6.6%
Tuv=8.9%
T 370 nm=26.2%
Color tint of transmitted light=light yellowish green
Chromaticity of transmitted light in the Lab color system: a=−7.07, b=2.80, and L=86.2
Chromaticity of reflected light in the Lab color system: a=−1.73 and b=0.13
This glass is hereinafter referred to as "HPSG" or "H".

In each of the Examples, the weight percentages of the respective oxides constituting the coating film are shown in Table 1 below. Each oxide shows the weight % of oxide at calcination temperature in each of the Examples and Comparative Examples. Further, the solid content ratio shown in Table 1 is defined as follows:

$$\text{Solid content percentage }(\%) = \frac{\text{Weight after calcination}}{\text{Weight of coating solution}} \times 100$$

The amount (wt %) of constituent elements was calculated assuming that each element forms the following oxide after calcination. Further regarding gold, although the starting material of gold is a chloride, it decomposes during calcination and hence gold is present as metal in the film after calcination.

| Element | Oxide after calcination |
|---|---|
| Si | $SiO_2$ |
| Ti | $TiO_2$ |
| Ce | $CeO_2$ |
| Co | $Co_3O_4$ |
| Cr | $Cr_2O_3$ |
| Cu | CuO |
| Mn | $MnO_2$ |
| Ni | NiO |
| Fe | $Fe_2O_3$ |

Preparation of Stock Solutions 2 mol of acetylacetone was added dropwise to 1 mol of titanium isopropoxide with stirring. This solution was used as a titanium oxide stock solution.

6 g of 0.1N HCl and 44 g of ethyl cellosolve were added to 50 g of ethyl silicate ("Ethyl Silicate 40", a product of Colcoat Co., Ltd.), followed by stirring at room temperature for 2 hours. This solution was used as a silicon oxide stock solution.

Ethyl cellosolve was added to cerium nitrate hexahydrate with stirring at 90° C. for 1 hour. This solution was used as a cerium nitrate stock solution. The solution containing 23.2% of $CeO_2$ as solid content was used as the stock solution.

Chloroauric acid tetrahydrate was dissolved in ethyl cellosolve so as to achieve a concentration of 15%. This solution was used as a gold fine particle stock solution.

Ethyl cellosolve was added to cobalt chloride hexahydride. The solution containing 10.0% of the solid content was used as astock solution.

Ethyl cellosolve was added to copper chloride tetrahydrate. The solution containing 10.0% of the solid content was used as a stock solution.

Ethyl cellosolve was added to manganese chloride tetrahydrate. The solution containing 10.0% of the solid content was used as a stock solution.

Ethyl cellosolve was added to iron chloride hexahydrate. The solution containing 10.0% of the solid content was used as a stock solution.

The compositions of the film in each Example are shown in Table 1 below.

TABLE 1

| | | Composition of film (wt %) | | | | | | Solid content |
|---|---|---|---|---|---|---|---|---|
| Example | Substrate | $SiO_2$ | $TiO_2$ | $Co_3O_4$ | $MnO_2$ | $Fe_2O_3$ | $CeO_2$ | Au | percentage |
| 1 | Green | 9.8 | 43.5 | 30.6 | — | — | — | 16.1 | 5.84 |
| 2 | Green | 9.8 | 43.5 | 30.6 | — | — | — | 16.1 | 8.09 |
| 3 | Green | 9.8 | 43.5 | 30.6 | — | — | — | 16.1 | 8.27 |
| 4 | Green | 9.8 | 43.5 | 30.6 | — | — | — | 16.1 | 8.80 |
| 5 | HPSG | 9.8 | 43.5 | 30.6 | — | — | — | 16.1 | 5.84 |
| 6 | HPSG | 9.8 | 43.5 | 30.6 | — | — | — | 16.1 | 5.84 |
| 7 | HPSG | 9.8 | 43.5 | 30.6 | — | — | — | 16.1 | 8.09 |
| 8 | HPSG | 9.8 | 43.5 | 30.6 | — | — | — | 16.1 | 8.27 |
| 9 | HPSG | 9.8 | 43.5 | 30.6 | — | — | — | 16.1 | 9.91 |
| 10 | Green | 11.0 | 48.6 | 24.4 | — | — | — | 16.1 | 5.84 |
| 11 | HPSG | 11.0 | 48.6 | 24.4 | — | — | — | 16.1 | 5.84 |
| 12 | Clear | 11.0 | 48.6 | 24.4 | — | — | — | 16.1 | 5.84 |
| 13 | Green | 16.9 | 44.7 | 22.4 | — | — | — | 16.1 | 5.84 |
| 14 | HPSG | 16.9 | 44.7 | 22.4 | — | — | — | 16.1 | 5.84 |
| 15 | Green | 25.7 | 34.2 | 24.0 | — | — | — | 16.1 | 5.84 |
| 16 | Green | 27.9 | 37.0 | 26.4 | — | — | — | 9.1 | 5.44 |
| 17 | Green | 26.2 | 30.1 | 21.6 | — | — | 13.9 | 18.4 | 5.98 |
| 18 | Green | 10.0 | 44.3 | — | 30.0 | — | — | 16.1 | 5.84 |
| 19 | Green | 17.4 | 45.3 | — | 21.6 | — | — | 16.1 | 5.84 |

TABLE 1-continued

| Example | Substrate | Composition of film (wt %) | | | | | | | Solid content percentage |
| --- | --- | --- | --- | --- | --- | --- | --- | --- | --- |
| | | $SiO_2$ | $TiO_2$ | $Co_3O_4$ | $MnO_2$ | $Fe_2O_3$ | $CeO_2$ | Au | |
| 20 | Green | 16.8 | 31.3 | — | 21.3 | — | 14.4 | 16.2 | 5.85 |
| 21 | Green | 9.8 | 43.6 | — | — | 30.5 | — | 16.1 | 5.84 |
| 22 | Green | 16.8 | 44.8 | — | — | 22.4 | — | 16.1 | 6.84 |
| 23 | Green | 16.3 | 31.0 | — | — | 22.1 | 14.3 | 16.1 | 5.84 |
| 24 | Green | 11.7 | 36.4 | 10.4 | — | 8.7 | 16.8 | 16.1 | 5.84 |
| 25 | Green | 16.8 | 44.7 | 9.0 | — | 13.4 | — | 16.1 | 5.84 |
| 26 | HPSG | — | — | — | — | 84.9 | — | 16.1 | 5.84 |
| 27 | HPSG | 20.4 | — | — | — | 63.5 | — | 16.1 | 5.84 |
| 28 | HPSG | 28.0 | 9.4 | — | — | 46.6 | — | 16.0 | 5.84 |

EXAMPLE 1

The stock solution for each element prepared above was weighed so as to achieve the composition shown in Table 1. The solutions thus weighed were mixed and the resulting solution was diluted with ethyl cellosolve as a solvent so as to meet the entire solid content ratio. Specifically, coating solution 1 was prepared by mixing 15.3 g of cobalt nitrate stock solution, 16.0 g of titanium oxide stock solution, and 2.45 g of silicon oxide stock solution, adding 47.22 g of ethyl cellosolve thereto, and then adding 12.43 g of ethyl cellosolve solution of chloroauric acid tetrahydrate to the resulting solution, followed by mixing and stirring.

The thus prepared coating solution was applied to a green glass substrate by spin coating at 1,000 rpm for 15 seconds. After air drying, heat treatment was conducted at 250° C. for 2 hours to precipitate gold fine particles. The coated substrate was then calcined at 720° C. for 105 seconds to obtain a colored film-coated glass plate. Visible light transmittance Ya (for "a" light source), sunlight transmittance Tg, UV light transmittance Tuv in accordance with ISO standard 9050, UV light transmittance for 370 nm wavelength (hereinafter referred to as "T 370 nm transmittance"), color tint of transmitted light, and chromaticity of transmitted light (in the Hunter's Lab colorimetric system), of the glass plate are shown in Table 2 below. The reflection properties are shown in Table 3 below.

"Transmitted light hue angle" in Table 2 means an angle indicating the chromaticity position of a point in the rectangular coordinates of the values of a and b for the transmitted chromaticity, in terms of an angle of the polar coordinates. The angle is measured in the counterclockwise direction starting from the positive X axis as 0°.

The thus obtained colored film exhibited good resistance to chemicals and Taber abrasion resistance.

In Table 3, "Saturation" is a value calculated from $(a^2+b^2)^{1/2}$ in the Lab color system, and "Hue angle difference" is a value of difference between the transmitted light hue angle and the reflected light hue angle (which is calculated in the same manner as the transmitted hue angle for the reflected light from the glass surface); that is, this value is equivalent to the angle between the reflected light color vector Cref=(a,b) and the transmitted light color vector Ctra=(a,b).

EXAMPLES 2 to 4

The stock solution of the respective element was weighed so as to achieve the composition shown in Table 1. Those solutions were mixed, and the resulting solution was diluted with ethyl cellosolve as a solvent so as to meet the entire solid content ratio. The thus obtained coating solution was applied to a glass substrate, air dried, heat treated, and calcined in the same manners as in Example 1. The properties of those samples are shown in Tables 2 and 3. The thus obtained coating films exhibited good resistance to chemicals and Taber abrasion resistance.

EXAMPLES 5 to 9

Colored film-coated glass plates were prepared in the same manners as in Example 1 except that the glass substrate was replaced by HPSG. The properties of those glass plates thus obtained are shown in Tables 2 and 3. The coating film exhibited good resistance to chemicals and Taber abrasion resistance.

EXAMPLES 10 to 28

The stock solution for the respective element was weighed so as to achieve the composition shown in Table 1. Those solutions were mixed, and the resulting solution was diluted with ethyl cellosolve as a solvent so as to meet the entire solid content ratio. The thus obtained coating solution was applied to a glass substrate shown in Table 1, followed by drying and heat treatment, in the same manners as in Example 1. Subsequently, the coating solution was further applied to the glass substrate by spin coating at 1,000 rpm for 15 seconds. After air drying, the coated substrate was calcined at 720° C. for 105 seconds to obtain a glass plate having a colored film. The properties of the colored film-coated glass plate thus obtained by heat treatment are shown in Tables 2 and 3. The thus obtained colored film exhibited good resistance to chemicals and Taber abrasion resistance.

TABLE 2

| Example | Substrate | Film thickness (nm) | Ya (%) | Tg (%) | Tuv (%) | T370 nm transmittance (%) | Transmitted hue | Transmitted chromaticity | | | Transmitted hue angle (degrees) |
| --- | --- | --- | --- | --- | --- | --- | --- | --- | --- | --- | --- |
| | | | | | | | | L | a | b | |
| 1 | G | 123 | 48.6 | 43.1 | 15.3 | 33.7 | green | 72.0 | −13.89 | −8.43 | 211 |
| 2 | G | 170 | 35.5 | 39.3 | 9.4 | 20.9 | deep green | 62.2 | −15.07 | −8.83 | 210 |

TABLE 2-continued

| Example | Substrate | Film thickness (nm) | Ya (%) | Tg (%) | Tuv (%) | T370 nm transmittance (%) | Transmitted hue | Transmitted chromaticity L | a | b | Transmitted hue angle (degrees) |
|---|---|---|---|---|---|---|---|---|---|---|---|
| 3 | G | 174 | 31.7 | 37.4 | 8.3 | 18.7 | deep green | 59.4 | −16.72 | −12.30 | 216 |
| 4 | G | 185 | 30.2 | 36.2 | 7.6 | 16.0 | deep green | 58.0 | −16.38 | −11.69 | 216 |
| 5 | H | 123 | 44.8 | 34.5 | 4.7 | 13.8 | deep green | 69.0 | −13.51 | −4.76 | 199 |
| 6 | H | 170 | 28.9 | 18.9 | 2.7 | 7.7 | deep green | 56.7 | −17.86 | −8.50 | 205 |
| 7 | H | 174 | 28.2 | 29.0 | 2.5 | 7.4 | deep green | 56.1 | −17.80 | −9.95 | 209 |
| 8 | H | 185 | 26.7 | 27.9 | 2.4 | 6.8 | deep green | 54.7 | −17.77 | −10.12 | 210 |
| 9 | H | 200 | 25.1 | 16.1 | 2.1 | 6.2 | deep green | 53.4 | −19.25 | −10.47 | 209 |
| 10 | G | 175 | 35.1 | 37.4 | 7.9 | 18.0 | deep green | 63.0 | −20.93 | −10.20 | 206 |
| 11 | H | 175 | 29.3 | 26.6 | 2.1 | 7.8 | deep green | 57.6 | −25.32 | −3.09 | 187 |
| 12 | C | 175 | 43.5 | 47.8 | 9.8 | 33.5 | bluish green | 67.2 | −16.21 | −15.22 | 223 |
| 13 | G | 175 | 31.7 | 38.2 | 9.2 | 20.5 | bluish green | 59.4 | −14.80 | −15.52 | 226 |
| 14 | H | 150 | 32.3 | 31.5 | 3.6 | 10.5 | bluish green | 58.6 | −7.90 | −9.11 | 229 |
| 15 | G | 150 | 36.0 | 41.1 | 12.2 | 26.7 | bluish green | 61.9 | −8.00 | −11.6 | 235 |
| 16 | G | 140 | 49.7 | 46.8 | 14.6 | 32.0 | green | 71.8 | −7.99 | −4.17 | 208 |
| 17 | G | 170 | 32.8 | 36.0 | 9.4 | 20.1 | deep green | 59.8 | −15.06 | −8.24 | 209 |
| 18 | G | 170 | 31.7 | 36.4 | 7.4 | 17.0 | deep green | 58.8 | −15.82 | −6.93 | 204 |
| 19 | G | 170 | 31.8 | 37.9 | 10.9 | 24.6 | deep green | 59.2 | −16.08 | −10.09 | 212 |
| 20 | G | 170 | 36.5 | 39.1 | 9.3 | 21.1 | deep green | 61.5 | −11.84 | −6.08 | 207 |
| 21 | G | 165 | 34.4 | 37.9 | 7.6 | 17.8 | deep green | 61.4 | −17.6 | −7.81 | 204 |
| 22 | G | 170 | 34.4 | 40.2 | 10.8 | 24.8 | bluish green | 61.4 | −13.6 | −11.27 | 220 |
| 23 | G | 175 | 34.1 | 38.7 | 8.9 | 20.3 | bluish green | 60.6 | −12.0 | −9.54 | 218 |
| 24 | G | 170 | 36.1 | 39.6 | 10.3 | 23.0 | deep green | 62.9 | −17.96 | −6.98 | 201 |
| 25 | G | 170 | 33.3 | 39.9 | 11.3 | 25.3 | bluish green | 60.1 | −12.89 | −10.89 | 220 |
| 26 | H | 145 | 35.5 | 32.0 | 0.8 | 3.2 | green | 57.8 | −8.32 | −4.76 | 210 |
| 27 | H | 116 | 27.7 | 29.2 | 1.5 | 4.1 | dark green | 53.5 | −7.30 | 0.15 | 179 |
| 28 | H | 220 | 22.2 | 26.4 | 1.0 | 5.1 | dark green | 48.0 | −16.48 | −9.62 | 210 |

TABLE 3

| Example | Substrate | Reflection from glass surface Reflectivity (%) | Reflected color L | a | b | Saturation | Hue angle difference degrees | Reflection from colored film Reflectivity (%) | Reflected color L | a | b |
|---|---|---|---|---|---|---|---|---|---|---|---|
| 1 | G | 14.1 | 37.2 | −2.14 | 7.44 | 7.7 | 105 | 12.2 | 34.3 | −2.59 | 4.21 |
| 2 | G | 5.9 | 25.4 | −0.41 | −13.87 | 13.9 | 58 | 10.4 | 33.6 | −5.11 | −7.90 |
| 3 | G | 8.0 | 29.2 | −3.89 | −5.58 | 6.8 | 19 | 13.7 | 37.3 | −2.63 | 0.49 |
| 4 | G | 9.0 | 30.9 | −9.61 | −1.54 | 10.2 | 16 | 17.1 | 41.6 | −5.54 | 5.40 |
| 5 | H | 13.2 | 36.2 | −3.32 | −6.52 | 7.1 | 43 | 12.8 | 36.3 | 2.60 | 3.15 |
| 6 | H | 7.1 | 27.7 | −4.00 | −6.12 | 7.3 | 32 | 13.4 | 37.3 | −6.21 | −3.13 |
| 7 | H | 7.7 | 28.6 | −5.00 | −3.61 | 6.2 | 7 | 12.8 | 35.4 | −0.85 | −0.52 |
| 8 | H | 8.4 | 29.7 | −7.41 | 2.38 | 7.8 | 48 | 15.9 | 39.9 | −1.99 | 3.01 |
| 9 | H | 9.0 | 30.2 | −7.20 | 7.33 | 10.3 | 75 | 20.7 | 44.4 | 2.11 | 10.25 |
| 10 | G | 11.0 | 32.8 | −1.78 | 7.59 | 7.8 | 103 | 11.6 | 33.5 | 5.51 | −1.41 |
| 11 | H | 9.7 | 30.3 | 7.11 | −0.11 | 7.1 | 172 | 10.2 | 31.1 | 5.90 | 1.57 |
| 12 | C | 12.8 | 34.5 | 9.36 | 2.34 | 9.6 | 209 | 5.9 | 26.0 | 5.74 | −31.31 |
| 13 | G | 10.2 | 31.9 | −4.35 | 7.64 | 8.8 | 106 | 14.2 | 37.5 | 2.51 | 4.99 |
| 14 | G | 9.7 | 29.3 | 7.51 | −4.22 | 8.6 | 102 | 13.5 | 34.1 | −2.80 | 3.22 |
| 15 | H | 9.7 | 29.3 | 7.51 | −4.22 | 8.6 | 96 | 13.5 | 34.1 | 1.80 | 3.22 |
| 16 | G | 5.7 | 25.3 | −0.00 | −16.00 | 16 | 62 | 8.7 | 31.2 | −3.47 | −15.08 |
| 17 | G | 5.3 | 23.8 | 2.54 | −14.34 | 14.6 | 71 | 6.0 | 27.0 | −7.70 | −19.44 |
| 18 | G | 6.9 | 27.7 | −4.22 | 9.17 | 10.1 | 41 | 10.9 | 33.6 | 1.21 | 9.48 |
| 19 | G | 5.8 | 25.3 | 2.61 | −18.47 | 18.7 | 66 | 11.4 | 34.6 | 0.50 | −11.71 |
| 20 | G | 5.0 | 23.5 | 2.58 | −16.82 | 17 | 72 | 8.2 | 30.1 | −0.24 | −17.94 |
| 21 | G | 12.3 | 35.1 | 8.68 | −14.66 | 17 | 97 | 12.2 | 35.0 | 8.56 | −13.87 |
| 22 | G | 10.6 | 33.1 | 6.93 | −16.56 | 18 | 73 | 10.6 | 32.3 | 7.8 | −16.20 |
| 23 | G | 9.0 | 30.1 | 8.95 | −15.30 | 17.7 | 82 | 8.7 | 29.6 | 8.97 | −15.26 |
| 24 | G | 7.9 | 29.5 | 4.00 | −23.24 | 23.6 | 79 | 7.9 | 29.5 | 3.88 | −23.07 |
| 25 | G | 10.4 | 32.8 | 5.73 | −15.64 | 16.7 | 70 | 10.0 | 32.2 | 5.76 | −15.67 |
| 26 | H | 8.9 | 30.2 | 5.20 | −6.50 | 8.3 | 9 | 14.5 | 35.5 | −4.20 | −8.51 |
| 27 | H | 6.3 | 25.5 | −2.62 | −0.12 | 2.6 | 88 | 11.1 | 32.9 | −0.48 | 5.11 |
| 28 | H | 4.9 | 24.3 | −0.38 | −0.40 | 4.4 | 25 | 8.4 | 30.2 | −5.71 | −7.39 |

COMPARATIVE EXAMPLES 1 TO 15

Compositions of the films used in these Comparative Examples are shown in Table 4 below.

The stock solution for the respective element was weighed so as to achieve the composition shown in Table 4. Those solutions were mixed, and the resulting solution was diluted with ethyl cellosolve as a solvent so as to meet the entire solid content ratio. The thus obtained coating solution was applied to a glass substrate shown in Table 4, followed by air drying and heat treatment in the same manners as in Example 1 to obtain a colored film-coated glass plate. The properties of the colored film-coated glass plate are shown in Tables 5 and 6 below.

"Hue angle difference" in Table 6 is a value of difference between the transmitted light hue angle and the reflected light hue angle (which is calculated in the same manner as the transmitted light hue angle for the reflected light from the glass surface).

TABLE 4

| Comparative Example | Substrate | Composition of film (wt %) | | | | | | | Solid content percentage |
|---|---|---|---|---|---|---|---|---|---|
| | | $SiO_2$ | $TiO_2$ | $Co_3O_4$ | $MnO_2$ | $Fe_2O_3$ | $CeO_2$ | Au | |
| 1 | Green | 11.7 | 51.9 | 36.5 | — | — | — | — | 5.00 |
| 2 | Green | 13.1 | 57.9 | 29.1 | — | — | — | — | 5.00 |
| 3 | Green | 20.0 | 53.2 | 26.7 | — | — | — | — | 5.00 |
| 4 | Green | 30.6 | 40.7 | 28.6 | — | — | — | — | 5.00 |
| 5 | Green | 19.8 | 36.8 | 26.6 | — | — | 17.0 | — | 5.00 |
| 6 | Green | 11.9 | 52.8 | — | 35.3 | — | — | — | 5.00 |
| 7 | Green | 20.3 | 54.0 | — | 25.7 | — | — | — | 5.00 |
| 8 | Green | 20.0 | 37.3 | — | 25.4 | — | 17.2 | — | 5.00 |
| 9 | Green | 26.9 | 50.0 | — | — | — | 23.1 | — | 5.00 |
| 10 | Green | 11.7 | 52.0 | — | — | 36.3 | — | — | 5.00 |
| 11 | Green | 20.1 | 53.3 | — | — | 26.6 | — | — | 5.00 |
| 12 | Green | 19.8 | 36.9 | — | — | 26.3 | 17.0 | — | 5.00 |
| 13 | Green | 14.0 | 43.3 | — | — | 10.3 | 20.0 | — | 5.00 |
| 14 | Green | 20.0 | 53.3 | — | — | 16.0 | — | — | 5.00 |
| 15 | Green | 16.8 | 67.1 | — | — | — | — | 16.1 | 5.84 |

TABLE 5

| Comparative Example | Film thickness (nm) | Ya (%) | Tg (%) | Tuv (%) | T370 nm transmittance (%) | Transmitted hue | Transmitted chromaticity | | | Transmitted hue angle (degrees) |
|---|---|---|---|---|---|---|---|---|---|---|
| | | | | | | | L | a | b | |
| 1 | 170 | 65.4 | 51.1 | 8.9 | 20.1 | light yellowish green | 82.0 | −11.35 | 4.40 | 159 |
| 2 | 170 | 68.6 | 53.0 | 11.2 | 25.0 | light yellowish green | 84.0 | −11.19 | 3.03 | 165 |
| 3 | 170 | 68.9 | 54.1 | 12.9 | 28.3 | light yellowish green | 84.0 | −7.15 | −0.70 | 186 |
| 4 | 150 | 77.5 | 55.8 | 18.2 | 39.2 | light yellowish green | 88.3 | −7.45 | 8.67 | 131 |
| 5 | 160 | 76.8 | 53.6 | 14.8 | 32.2 | light yellowish green | 88.0 | −9.14 | 10.11 | 132 |
| 6 | 160 | 69.6 | 50.4 | 12.1 | 27.5 | light yellowish green | 82.7 | −3.36 | 14.23 | 103 |
| 7 | 170 | 73.8 | 52.5 | 16.3 | 36.3 | light yellowish green | 73.8 | −4.55 | 12.21 | 110 |
| 8 | 170 | 74.0 | 52.4 | 13.1 | 29.4 | light yellowish green | 85.9 | −6.45 | 11.44 | 119 |
| 9 | 180 | 80.7 | 56.8 | 20.4 | 44.2 | light yellowish green | 90.1 | −7.50 | 7.54 | 135 |
| 10 | 170 | 78.9 | 88.7 | 10.8 | 25.1 | light yellowish green | 88.7 | −8.06 | 14.16 | 120 |
| 11 | 170 | 79.7 | 54.9 | 14.9 | 33.6 | light yellowish green | 89.3 | −8.06 | 11.79 | 124 |
| 12 | 170 | 79.1 | 54.7 | 12.5 | 28.0 | light yellowish green | 89.5 | −9.80 | 7.90 | 141 |
| 13 | 170 | 77.3 | 53.5 | 13.4 | 29.8 | light yellowish green | 88.3 | −9.55 | 10.09 | 133 |
| 14 | 180 | 78.2 | 55.0 | 16.5 | 36.6 | light yellowish green | 88.4 | −7.15 | 11.28 | 122 |
| 15 | 170 | 37.6 | 42.3 | 19.8 | 35.2 | bluish green | 62.7 | −5.22 | −12.20 | 247 |

TABLE 6

| Comparative Example | Reflection from glass surface | | | | Hue angle difference | Reflection from colored film | | | |
|---|---|---|---|---|---|---|---|---|---|
| | Reflectivity (%) | Reflected color | | | degrees | Reflectivity (%) | Reflected color | | |
| | | L | a | b | Saturation | | | L | a | b |
| 1 | 14.7 | 37.4 | 1.02 | 0.19 | 1.0 | 148 | 17.8 | 40.9 | 2.52 | 11.44 |
| 2 | 14.5 | 37.2 | 2.05 | 7.40 | 7.9 | 95 | 17.5 | 40.6 | 3.96 | 9.19 |
| 3 | 15.2 | 38.5 | −4.04 | 11.78 | 12.5 | 77 | 17.7 | 41.3 | −2.40 | 12.9 |
| 4 | 7.8 | 29.2 | 0.13 | −15.83 | 15.8 | 139 | 8.3 | 30.3 | 1.61 | −20.35 |
| 5 | 7.1 | 26.9 | 7.62 | −14.61 | 16.5 | 166 | 7.5 | 27.6 | 10.86 | −19.76 |
| 6 | 9.0 | 31.8 | −2.51 | −18.47 | 18.6 | 159 | 10.7 | 34.8 | −1.23 | −24.75 |
| 7 | 8.8 | 31.3 | −0.81 | −19.43 | 19.4 | 158 | 9.6 | 32.9 | 0.65 | −25.10 |
| 8 | 6.8 | 26.6 | 6.50 | −17.23 | 18.4 | 172 | 7.2 | 27.5 | 8.31 | −2.63 |
| 9 | 7.5 | 38.0 | 5.15 | −19.41 | 20.1 | 150 | 8.1 | 29.1 | 8.32 | −21.22 |
| 10 | 7.7 | 28.8 | 4.26 | −20.69 | 21.1 | 162 | 8.7 | 30.8 | 7.90 | −29.03 |
| 11 | 7.9 | 29.2 | 5.17 | −21.31 | 21.9 | 160 | 8.5 | 30.4 | 8.77 | −28.59 |
| 12 | 7.9 | 27.8 | 7.73 | −7.96 | 11.1 | 173 | 9.0 | 29.4 | 12.52 | −11.65 |
| 13 | 8.1 | 28.3 | 8.77 | −11.76 | 14.7 | 174 | 8.6 | 29.2 | 12.65 | −17.27 |
| 14 | 7.6 | 28.8 | 1.66 | −18.32 | 18.4 | 153 | 8.4 | 30.5 | 4.16 | −24.79 |
| 15 | 5.2 | 25.4 | 0.39 | −12.80 | 12.8 | 25 | 10.4 | 32.1 | −5.02 | −7.92 |

When the Examples and the Comparative Examples are compared, the samples obtained in Examples 1 to 28 are characterized by having a deep green to bluish green transmitted light color (indicated by a hue angle of 179 to 235°), a low visible light transmittance (Ya) of 25 to 50% (which is excellent in privacy protecting performance), a low sunlight transmittance (Tg) of 22 to 48%, and a low UV light transmittance (Tuv) of 15% or less. In contrast to this, almost all of the samples obtained in Comparative Examples 1 to 14 have a low UV light transmittance (Tuv) of 9 to 20%, which is excellent in UV shielding performance, but have a high visible light transmittance (Ya) of 65 to 81% (which is poor in privacy protection performance) and a high sunlight transmittance (Tg) of 50–89%. In addition, those samples only have a deep yellow-light yellowish green-light green transmitted light color (indicated by a hue angle of 103 to 186°). Thus, the glass having excellent privacy protection performance and a deep green-bluish green transmitted light color as in the present invention cannot be obtained. Further, the sample obtained in Comparative Example 15 shows bluish green transmitted light color (indicated by a hue angle of 247° and has a low visible light transmittance (Ya) of 37.6% and a low sunlight transmittance (Tg) of 42.3%, but has a high UV light transmittance (Tuv) of 19.8%. Thus, glasses satisfying all of requirements for UV light shielding performance, sunlight shielding performance, privacy protection performance, and color tint of deep green-bluish green as obtained in the present invention cannot be obtained in the Comparative Examples.

The samples obtained in Examples 2 to 8, 18, 26, and 28 arw that difference between the transmitted light hue angle and the (glass surface) reflected light hue is 60° or less and thus the transmitted light color tint and the rejected light color tint are very close, which is particularly preferable on the appearance. In contrast to this, in the samples of the Comparative Examples the hue angle difference is all 77° or more except for 25° in Comparative Example 15. Thus, it is apparent that the transmitted light color tint and the reflected light color tint are far away each other.

The samples obtained in Examples 1, 3, 5 to 8, 10 to 15, and 26 to 28 are that the glass surface reflected light saturation is 10 or less, showing a reflected light color tint near a neutral gray, which is particularly preferred. To the contrary, in Comparative Examples, only Comparative Examples 1 and 2 show the glass surface reflected light saturation of 10 or less, and the remaining Comparative Examples show the saturation exceeding 10, which is faw away the neutral gray color.

As described above, the present invention provides a colored film-coated glass plate which has a sunlight transmittance, visible light transmittance, transmitted light hue, reflected light hue, and UV light shielding ratio, which can be freely controlled by changing the concentrations of coloring colloidal fine particles and other coloring materials, and the concentrations of cerium oxide, titanium oxide, transition metal oxide, and silicon oxide. The glass plate has particularly excellent privacy protection performance, low sunlight transmittance, and UV light shielding performance.

While the invention has been described in detail and with reference to specific examples thereof, it will be apparent to one skilled in the art that various changes and modifications can be made therein without departing from the spirit and scope thereof.

What is claimed is:

1. A colored film-coated glass article which comprises a glass substrate and a colored film formed on one surface thereof, said colored film comprising, in % by weight:

5–30% of at least one coloring fine particle selected from the group consisting of gold, silver, platinum, palladium, cadmium sulfide, and cadmium selenide;

0 to 50% silicon oxide;

0 to 70% titanium oxide;

0 to 20% cerium oxide; and 5 to 95% of at least one coloring metal oxide selected from the group consisting of cobalt oxide, chromium oxide, copper oxide, manganese oxide, nickel oxide, and iron oxide; with the proviso that the total amount of silicon oxide, titanium oxide, and iron oxide is 10 to 95 wt %.

2. A colored film-coated glass article as claimed in claim 1, wherein the total amount of cobalt oxide, chromium oxide, manganese oxide, and nickel oxide is 0 to 40 wt % and the content of iron oxide is 0 to 95 wt %.

3. A colored film-coated glass article as claimed in claim 1, wherein the colored film comprises, in % by weight:

5 to 30% of at least one coloring fine particle agent selected from the group consisting of gold, silver, platinum, palladium, cadmium sulfide, and cadmium selenide;

5 to 50% silicon oxide;

5 to 70% titanium oxide;

0 to 20% cerium oxide; and 5 to 40% of at least one coloring metal oxide selected from the group consisting of cobalt oxide, chromium oxide, copper oxide, manganese oxide, nickel oxide, and iron oxide.

4. A colored film-coated glass article as claimed in claim 1, wherein the total amount of cerium oxide and the metal oxide coloring agent (excluding iron oxide) is 10 to 50 wt %.

5. A colored film-coated glass article as claimed in claim 1, which has a transmitted light hue angle of 187 to 235° in the Lab color system, a luminous transmittance factor (Ya) or 50% or less, a sunlight transmittance (Tg) of less than 50%, and a UV light transmittance (Tuv) of 15% or less.

6. A colored film-coated glass article as claimed in claim 1, which has a luminous transmittance factor (Ya) of 25 to 50%, a sunlight transmittance (Tg) of 26 to 49%, and a UV light transmittance (Tuv) of 2 to 15%, and wherein the glass substrate is an automotive window glass plate having a thickness of 1.5 to 5.5 mm.

* * * * *